United States Patent Office 3,010,919
Patented Nov. 28, 1961

3,010,919
TRIMETHYLOLPHENOL-POLYOL THERMO-SETTING COPOLYMERS
Herbert W. Mackinney, Paterson, and Cal Y. Meyers, Princeton, N.J., assignors to Union Carbide Corporation, a corporation of New York
No Drawing. Filed Nov. 1, 1956, Ser. No. 619,682
21 Claims. (Cl. 260—17.2)

This invention relates to novel thermosetting copolymeric resins prepared from 2,4,6-trimethylolphenol and polyol compounds containing a plurality of reactive aliphatic hydroxyl groups. More particularly, this invention relates to the preparation of novel fast-curing thermosetting compositions which can be prepared under aqueous conditions from 2,4,6-trimethylolphenol and polyhydroxy compounds such as polymeric compounds containing a plurality of aliphatic hydroxyl groups, polysaccharides, and aliphatic polyhydroxy compounds.

It is known that thermosetting resinous polymer compositions can be prepared by reacting methylolphenyl ethers such as 1-alkoxy-2,4,6-trimethylolbenzenes with polyhydroxy compounds, such as polyvinyl alcohols, hydrolyzed polyvinyl acetate, ethylene glycol, etc. However, such condensation products have not been altogether satisfactory for many applications because of high curing temperatures and high acid concentrations required to thermoset the resin. In addition, the lack of economical methods for carrying out the resinification have made the products relatively expensive. With the trimethylolphenyl ethers, a high temperature and a high concentration of acidic catalyst is necessary in order to drive the polymerization reaction to completion within a reasonable time. In addition, suitable polymerization techniques are expensive and difficult to maintain to a product of predictable properties. Since the trimethylolphenyl ethers are not readily soluble in water, the polymerization with polyhydroxy compounds must of necessity, be carried out in other than aqueous solutions. Because of the poor curing characteristics of the resinous products, these products have not been altogether satisfactory for such uses as coatings and as paint or varnish bases.

Building boards of the Portland cement type generally present an extremely porous and dusty surface and contain alkaline materials which are destructive to oil-base paints. Modern latex paints are resistant to alkali, but when they are applied to such substrates, the surface dust and the porous nature of the substrate rapidly withdraw the water from the latex and the solid phase is precipitated before it is able to form a continuous, tenaciously adherent film. Consequently, the paint does not adhere adequately and the coating is unacceptable. Ordinary sizings, such as casein, starch, and the like, lack adequate water resistance. A need, therefore, exists for a coating which can be applied from a substantially aqueous solution, which will not penetrate excessively, and which, after a fairly brief period of air-drying at room temperature, will form a tenaciously adherent, water and alkali resistant film over which an adhesive coating of latex paint may be applied satisfactorily.

Cellulose building boards are commonly surfaced by the manufacturer with an inexpensive coating over which paint or wallpaper is subsequently applied. Most such coatings have poor water resistance. Also, the flammable nature of such boards and their porous structure invite propagation of fire. An inexpensive water-resistant binder for fire-retarding materials would make feasible the manufacture of improved boards.

We have now found a class of resinous copolymeric compositions can be prepared from 2,4,6-trimethylolphenol and polyol compounds which overcome the disadvantages incurred by the products and processes of the prior art. For instance, these products can be prepared in aqueous solutions from reactants which themselves are water-soluble to form a product having a fast rate of cure at ambient temperatures to a rigid, water-insoluble infusible resin. These products can be cured to water-resistant resins either by air drying at room temperature, or if desired, by heating. Because of their air drying or room temperature hardening characteristics, these new resins are useful as coatings, particularly as primer coats for dusty and porous surfaces, such as cellulosic and cement-type building boards, masonry, brick, plastic, and the like, and as laminating varnishes, adhesives, bonding agents, and the like. They can also be compounded with fillers such as asbestos, mica, paper pulp, cotton flock, wood flour, clay, and the like, to provide molding and coating compositions having excellent light and weather resistance, improved toughness and flexibility, and superior adhesion to porous and non-porous surfaces.

The resinification reaction can be conducted as either a two-stage or as a one-stage process. In the two stage process, the 2,4-6-trimethylolphenol and the polyhydroxy compound are mixed and reacted, preferably in an aqueous medium with an acidic catalyst, to a fusible, heat-hardenable, soluble copolymer. In the presence of an acidic catalyst, the reaction proceeds without benefit of heat, although if desired, heat may be applied to hasten the reaction. Alternatively, heat alone in the absence of an acidic catalyst will induce the reaction. The fusible resin prepared in the first stage can be used as made, can be diluted with an appropriate solvent, or may be dehydrated or desolvated by evaporation, distillation, spray-drying or other techniques such as are generally suitable for dehydration or desolvation of heat-reactive materials. The fusible resins so prepared generally possess good shelf-life. They can be employed in adhesives, paints, coatings, laminates, molding compositions, abrasive elements and the like, and can be mixed or compounded with fillers, pigments, densifiers, lubricants, liquid vehicles, and such other modifiers as are generally employed in formulating known thermosetting resin compositions for use in such applications. Acidic cure-accelerators may also be incorporated, if desired; and the resinous composition can be cured to an infusible product either at room temperature or at elevated temperature, either at atmospheric pressure or under superatmospheric pressures, depending on the particular composition and end-product involved. Alternatively, in the one-stage process, the trimethylolphenol and polyhydroxy compound—and modifiers, if any—are premixed and said mixture is reacted directly to an infusible product without interrupting the reaction to isolate the fusible resin intermediate.

Resinification and curing of these products is accelerated by the use of acidic catalysts. Acids such as hydrochloric, sulfuric, phosphoric, oxalic, or sulfamic can be used, as well as acid salts, for instance, ammonium sulfamate, and esters, for instance, tris-(beta-chloroethyl) phosphate, or other acid-releasing compounds capable of reducing the pH of the initial reaction mixture to less than about 5. At or below a pH of 5, the curing time of the resin is reduced appreciably and the cured products are generally of lighter color. It is, therefore, preferred to employ an acidic catalyst in the practice of this invention in both the two-stage and one-stage process.

The fusible resins produced herein can be thermoset even at low cure temperatures. The heat-hardened products are water-insoluble, infusible and have very good resistance to non-oxidizing and non-reducing acids, excellent resistance to substantially neutral organic solvents such as hydrocarbons, alcohols, and the like, and acceptable alkali resistance. The cured resins generally are a natural ivory to light tan color and when formed into films and coatings have a high degree of toughness and flexibility, and excellent adhesion characteristics. When cured on a substrate such as a cement-type building board, cellulose building board, or other porous surface, the resin forms a continuous, tenaciously adherent film which is highly resistant to water and forms an excellent base for oil and latex-base paints.

The water-resistant infusible resinous products of this invention are relatively unique in that they can be formed from aqueous solutions at ambient temperatures from reactants which are themselves soluble in water. The reaction mixture can be dissolved or diluted with water, alcohol, or other suitable solvent, and pigments, fillers, etc. are added and suspended in the solution for application to the substrate. On evaporation of the water or other solvent, the resin containing mixture remains as a homogeneous film which acquires a high degree of water resistance within a few hours to a few days at room temperature. By way of contrast, prior products suggested for application from aqueous solutions, such as those prepared of water-soluble phenol-formaldehyde condensates, are generally dark in color and do not cure adequately at room temperature and require baking at temperatures generally exceeding 100° C. to develop satisfactory water resistance. While it may be preferred at times to accelerate the removal of water and curing of these resins by the application of heat, such means are not required.

The trimethylolphenol can be employed in the crystalline form or in a solution in water or a low molecular weight alcohol or water-alcohol mixture, or a ketone such as acetone, or other suitable solvent, for instance dioxane. If desired, the trimethylolphenol can be formed in situ in the reaction mixture from a salt of trimethylolphenol, such as the sodium or barium salt. The trimethylolphenol must be substantially free of resinous materials, i.e. molecules containing a plurality of phenolic rings, and/or molecules containing unsubstituted ortho- and para-phenolic ring positions. The presence of such components in the trimethylolphenol tends to give inferior products having erratic curing characteristics, poor clarity in films and coatings, and poor adhesive and bonding properties. The trimethylolphenol can be prepared substantially free of such resinous materials in the manner disclosed by Freeman, J. Am. Chem. Soc., 74, 6257 (1952) or by the manner of Martin, J. Am. Chem. Soc., 74, 3024 (1952) from the sodium or barium salts of 2,4,6-trimethylolphenol. The preferred products of this invention are made employing reactant ratios of from about 0.1 part to about 12.0 parts by weight of the 2,4,6-trimethylolphenol per part of the polyhydroxy compound.

Suitable polyol compounds which can be employed to produce the thermosetting copolymers of this invention include compounds having a plurality of reactive aliphatic hydroxyl groups, for instance, aliphatic polyols such as ethylene glycol, propylene glycol, pentamethylene glycol, glycerine, pentaerythritol, sorbitol, inositol, and the like, polysaccharides, such as sugars, starches, hydroxyethyl cellulose, and the like, and polymeric hydroxyl-containing materials, such as polyoxyethylene glycol, polyvinyl alcohol, hydroxyethyl polyvinyl alcohol, and polyvinyl acetate in which a portion of the acetate groups have been hydrolyzed to hydroxyl groups. The preferred compounds are water-soluble compounds having as the sole reactive groups under the conditions of the reaction, a plurality of reactive aliphatic hydroxyl groups. Even more particularly preferred are those composed only of carbon, hydrogen, and oxygen, and having as the sole reactive groups under the conditions of reaction, a plurality of reactive aliphatic hydroxyl groups.

While not desiring to be bound by any particular theory, it is our belief that the resinification reaction involves a series of etherifications between the methylol groups of the 2,4,6-trimethylolphenol and the aliphatic hydroxyl groups of the polyhydroxy compound. The phenolic hydroxyl group does not appear to enter into the resinification or curing reactions. However, the presence of the phenolic hydroxyl group, we believe, is the prime factor in providing the surprising results achieved with these copolymers. The faster rate of resinification and curing of the trimethylolphenol-polyhydroxy compound copolymers over the trimethylolphenol ether compositions and the adaptability of the resinification to aqueous solution appears to be directly attributable in a large part to the presence of this phenolic hydroxyl group. Also, the phenolic hydroxyl group appears to exercise considerable influence on the adhesion behavior of these copolymeric products, which is particularly surprising. Etherification of this hydroxyl group effects a pronounced reduction in adhesion to substrate surfaces, particularly to non-porous, polar surfaces such as are presented by metals, glass, and the like. With the products of this invention, adhesion to both non-porous and porous surfaces is excellent and considerably superior. This feature, we believe, is directly influenced by the presence of the phenolic hydroxyl group in the resinous product.

The following examples are illustrative. Unless otherwise specified, all parts are parts by weight.

Example 1

Each of the seven mixtures whose compositions are shown below was processed in the following manner:

|     | Parts 50% Aqueous TMP [1] Solution | Parts Ethylene Glycol | Parts Pentamethylene Glycol | Parts 85% H$_3$PO$_4$ |
| --- | --- | --- | --- | --- |
| (A) | 73.6 | 18.6 |      | 2.8 |
| (B) | 73.6 | 18.6 |      | 9.5 |
| (C) | 36.8 | 6.2  |      | 1.2 |
| (D) | 36.8 | 3.1  |      | 1.1 |
| (E) | 73.6 |      | 31.2 | 4.0 |
| (F) | 36.8 |      | 10.4 | 1.5 |
| (G) | 36.8 |      | 5.2  | 1.2 |

[1] Trimethylolphenol.

The 2,4,6-trimethylolphenol solution and glycol were mixed thoroughly and the phosphoric acid was then added slowly with agitation. The mixture was then poured onto a 130° C. chrome-plated hot plate and stoved thereon by stroking it with a spatula until substantially all the water was evaporated and the reaction mixture attained a tacky consistency. It was then immediately removed from the hot plate and cooled. A fusible, heat-hardenable resin was obtained in each case. Two-inch diameter discs were prepared from each of the foregoing resins by compression molding for three minutes at 170° C. and 500 p.s.i. pressure. The thermoset discs were all light colored, ranging in color from ivory to tan. Eleven hours in an XIA Weatherometer effected a barely discernible change in the colors of the respective discs. Comparable discs prepared of a commercial phenol-formaldehyde condensate resins showed considerable discoloration after a comparable time in the weatherometer.

Example 2

A mixture consisting of 8329 grams of 70 percent aqueous 2,4,6-trimethylolphenol, 3140 grams ethylene glycol, 191 grams hexamethylenetetramine, and 270 grams 25 percent phosphoric acid was charged to a 5-gallon stainless steel resin still set for vacuum distillation. The mixture had a pH of 3.7. The pressure was reduced to 50–75 mm. of mercury and the mixture gradually heated to provide smooth distillation. The batch temperature rose gradually to 90° C. in about one hour during which time 3083 grams distillate were collected. The reaction mixture was maintained at 90° C.–95° C. for one hour. The pressure was increased slightly until the batch temperature rose to 100° C. and the reaction mixture maintained at 100° C.–105° C. for 1.5 hours. A sample tested for gel speed at this point had a gel time on the 150° C. hot plate of 41 seconds. One thousand eight hundred grams of 95 percent ethanol was drawn into the still and the mixture was agitated to effect dissolution, cooled, and discharged. There was so obtained 9546 grams of straw colored varnish having a viscosity at 25° C. of 11,200 cst., a specific gravity of 1.176, a set time at 130° C. of 500 sec. and a resinous solids content of 69 percent.

*Example 3*

A mixture consisting of 8500 grams of 70 percent aqueous 2,4,6-trimethylolphenol, 1972 grams ethylene glycol, and 1200 grams of 25 percent phosphoric acid was charged to a still as per Example 2. The reaction mixture had an initial pH of 2.6. The mixture was vacuum dehydrated at about 50 mm. pressure to a batch temperature of 90° C. During this interval, about 80 minutes, 3430 grams of aqueous distillate were collected. The reaction mixture was maintained at 90° C.–95° C. for 10 minutes (150° C. gel time at this point was 50 secs.). One thousand eight hundred grams of 95 percent ethanol were drawn into the still, dissolution effected by agitation, the reaction mixture cooled and discharged. The 9360 grams of straw colored varnish so prepared contained 67 percent solids, had a specific gravity of 1.218, a viscosity at 25° C. of 764 cst. and a set time at 130° C. of 450 seconds.

*Example 4*

A mixture consisting of 8500 grams of 70 percent aqueous 2,4,6-trimethylolphenol, 3380 grams of diethylene glycol, and 1200 grams of 25 percent phosphoric acid was charged to a still as per Example 2 (reaction mixture pH=2.7). The mixture was vacuum dehydrated at 50–75 mm. pressure to a batch temperature of 89° C. During this interval (about 70 min.), 3130 grams of distillate were collected. The reaction mixture at this point had a 150° C. hot plate gel time of about 75–80 seconds. The mixture was cooled by vacuum refluxing and discharged. The 9735 grams of varnish so prepared was a straw colored viscous liquid (viscosity at 25° C.=18,500 cst.) having a specific gravity of 1.27 and a set time at 130° C. of 530 seconds.

*Example 5*

A mixture consisting of 1430 grams of the product of Example 2, 870 grams wood flour, 100 grams titanium dioxide and 30 grams stearic acid was charged to a 5-gallon vacuum kneader and mixture for about ½ hour. Pressure was then reduced to about 75 mm. and maintained at this level overnight in order to distill off the solvents (no external heat was applied to the kneader during this interval). The dried mixture was then kneaded an additional 5–10 minutes to break up the aggregates and provide a homogeneous mixture, then discharged. The following moldings were made from the above-described molding composition.

Cylindrical screw-threaded bottle caps approximately 1-inch high and 1-inch in diameter were molded under a total load of 6-ton. At a molding temperature of 305° F., blister-free caps were obtained with a cure time of three minutes 52 seconds. At 335° F., blister-free caps were obtained in 3 minutes 5 seconds. (These times are frequently referred to as the "minimum blister-free cure time.")

Rectangular bars 5 inches long x ½" wide x ¼" thick and 2½" long x ½" wide x ½" thick and 2" diameter discs were prepared by molding at 320° F. and 2000 p.s.i. pressure for five minutes. The bars were tested as prescribed by ASTM standard methods D–790–49T and D–256–47T, both after molding and after an additional 22 hours after-bake at 300° F., with the following results:

|  | As-Molded Bars | After-Baked Bars |
|---|---|---|
| Flexural Strength, p.s.i. | 4,100 | 4,700 |
| Flex. Mod. of Elast., p.s.i. | $1.8 \times 10^5$ | $6.2 \times 10^5$ |
| Flex. Work to Break, ft. lbs. | 0.54 | 0.088 |
| Max. Deflection, mils | 470 | 80 |
| Izod Impact, ft. lbs./in. notch | 0.29 | 0.24 |

The 2-inch discs were exposed in a X1A Weatherometer in order to determine their light resistance. After 20 hours in the Weatherometer, the discs still had a reasonably good appearance and had darkened somewhat. Similar discs prepared from a commercial phenol-formaldehyde resole molding composition and tested concurrently for comparison had a very poor appearance, significantly worse than the previously cited discs, after only 10 hours in the Weatherometer.

*Example 6*

Approximately 1/16-inch thick laminated panels were prepared from the compositions show below in the following manner. The indicated reaction mixture was charged to the pan of a laminating treater and Buckeye 10 mil cotton linter paper passed through said mixture and through the 30 foot long oven section of the treater, which was maintained at about 128° C.–130° C., at a rate of about 3.3–3.5 feet per minute. (This provided a dwell time in the oven of about 8.5–9 minutes.) Eight sheets of the so-treated paper, which have the resin contents and volatile contents shown below, were laid-up and pressed into a laminated panel by molding for 30 minutes at 325° F. and 1000 p.s.i. pressure. Each of the panels was cold punched with no evidence of cracking, even at the corners of rectangular punch-outs, in any instance. One-inch by three-inch sections cut from the panels were tested for water absorption by weighing them before and after a 24 hour immersion in 23° C. water. The results are:

|  | Sample A | Sample B | Sample C |
|---|---|---|---|
|  | (3890–45 | 46 | 52) |
| Reactant Mixture: | | | |
| 70% aqueous TMP [1] solution | 263 | 263 | 263 |
| pentamethylene glycol | 104 | 52 | 78 |
| phosphoric acid (85%) | 7.2 | 5.9 | 0 |
| Treated Paper: [2] | | | |
| resin content (percent) | 60 | 62 | 58 |
| volatile content (percent) | 3.8 | 4.1 | 7.1 |
| Laminated Panel: | | | |
| water absorption (percent) | 0.98 | 0.49 | 0.86 |

[1] 2,4,6-trimethylolphenol.
[2] The resin content of the treated paper was determined by weighing samples of both the initial untreated paper and the treated paper after it had emerged from the treater-oven and been cooled in a desiccator. The volatile content was determined by measuring the weight lost by the same treated-paper sample on heating same for 10 minutes at 160° C.

Synthetic-resin bonded glass fiber insulation batts are generally prepared by the following process. The hot glass fibers and an aqueous spray of the resinous binder are admitted to a forming hood. The water is flashed off in this chamber and the glass fibers onto which the resinous binder has deposited settle slowly into a pack on an endless belt travelling along the floor of the hood. Said pack then travels through an oven and a stream of hot air which is forced through the pack serves to cure the resin and effect fiber bonding.

To be useful in the preparation of glass batts by this process and for various other bonding applications, a resin must possess the following properties. First, it must be capable of dilution with water without separation of solid particles which would clog the spray nozzles. Second, it must not spray-dry at temperatures of about 400° F.– 450° F. A resin is said to "spray-dry" when it pre-cures in flight, i.e., before it impinges on the target, and deposits as an infusible, powdery material which has no bonding action. Third, the resin must be adherent to glass; and fourth, the cured resin must possess adequate water resistance.

The new resins of this invention possess these attributes and are therefore useful for such applications as are illustrated by the following examples.

*Example 7*

Each of three mixtures, A, B, and C, consisting of 100 parts of 70 percent aqueous 2,4,6-trimethylolphenol and 6.3 parts of (A) sorbitol, (B) a polyoxyethylene glycol having an average molecular weight of about 1500, and (C) pentaerythritol, was treated as follows. The mixture was diluted with water to about 50 percent solids. (Solids content as cited in this example refers to the nonvolatile residue remaining after a mixture consisting of 2 grams of the test material and 10 ml. methanol was heated for two hours at 149° C. in an uncovered pannikin.)

One portion of the solution was then sprayed onto a glass cloth disc by means of a hot air stream. The air temperature on the inlet side was 450° F. and about 320° F. on the outlet side, i.e., after it had passed through the target disc. In all three cases the resin formed a stiff coating on the disc which coating was in the form a shiny film, showed good to excellent penetration and no evidence of any spray drying. A second portion of the 50 percent solids solution was doctored onto clean glass plates to provide an approximately 15 mil thick (wet) coating, then dried and baked about 10 minutes at 300° F. to provide an approximately 4–5 mil film. The so-coated glass plate was then immersed in water at room temperature and examined periodically for film appearance and adherence. The film from (A) loosened somewhat from the glass plate after 13 hours' immersion, but the film was entirely clear. The film from (B) assumed a slight blush after 12 hours' immersion and started to loosen after 48 hours. The film from (C) was firmly adherent and not visibly changed in appearance after 16 hours' immersion.

For purposes of comparison, a film formed in similar manner from a commercial water-soluble phenol-formaldehyde resin sold by the Bakelite Co. under the designation BR–12302, which is currently used industrially in the manufacture of glass fiber batts, loosened away from the glass plate after 16 hours' immersion. Also, when sprayed onto a glass disc in the same manner cited above, the 12302 provided a somewhat dull film which showed very good penetration and no spray drying, but the coating was so stiff that fibers were broken when the disc was flexed.

Printing grade paper is usually surfaced with a clay-starch composition in order to improve its gloss and surface smoothness and to minimize ink penetration. Since ordinary starch is hydrophilic, it is generally "insolubilized," i.e., rendered more hydrophobic, by treatment with a thermosetting resin, generally a urea-formaldehyde resin, in order to provide the starch-clay coating with an adequate degree of water resistance. Urea-formaldehyde resins and urea-formaldehyde-treated starch solutions have poor storage stability, that is, they tend to gelatinize rapidly at room temperature, hence cannot be stored conveniently.

Starch-trimethylolphenol reaction products of the present invention are very much more stable than the prior art starch-urea resin products and provide the same degree of water resistance to clay-starch coating compositions prepared therefrom as illustrated by the following example.

*Example 8*

A mixture consisting of 1000 parts clay (sold by Mineral & Chemical Corp. under the name of ASP-HTS), 3 parts sodium pyrophosphate and 500 parts water was ball milled 30 minutes. To this clay paste was added 480 parts of a starch solution prepared by heating 96 parts chlorinated starch (manufactured by National Starch Products Co. under the name of "Flo-Coat") and 384 parts water together for 15 minutes at 190° F. and the mixture was ball milled an additional 10 minutes. The mixture was divided into 5 equal portions designated *a, b, c, d,* and *e*. To (*a*) was added 0.96 part crystalline 2,4,6-trimethylolphenol (i.e., 5 percent based on starch weight); to (*b*) was added 4.8 parts crystalline 2,4,6-trimethylolphenol (i.e., 25 percent based on starch weight); to (*c*) and (*d*) were added respectively 0.96 and 4.8 parts of a commercial urea-formaldehyde resin ("Urea-formaldehyde Concentrate 85" sold by Allied Chemical Co.); (*e*) was left unmodified and served as a control. The pH of each of the five mixtures was adjusted to about 4.6 with aluminum chloride. A 3 mil (wet) coating of each was doctored onto filter paper, air dried about 6 hours at room temperature, then "converted" by heating for 30 seconds at 350° C. The coated papers were then immersed in water, rubbed between the fingers, and the time for the clay-starch coating to rub off was noted.

```
                                  Time before slay rubbed off, seconds
(e) Control_____  0
(a) 5% TMP¹_____ 10–15
(b) 25% TMP¹_____ 200+
(c) 5% U-F resin_____ 10–15
(d) 25% U-F resin_____ 200+
```
¹ 2,4,6-trimethylolphenol.

In another variation of the foregoing experiment, the trimethylolphenol was mixed with the starch before the starch solution was prepared. The clay-starch-TMP coating prepared in this manner showed the same water rub off time as the coating of the corresponding composition made in the previously cited manner.

A mixture consisting of 120 parts of the same chlorinated starch, 450 parts water, 30 parts 2,4,6-trimethylolphenol and 0.9 part hydrated aluminum chloride was heated 15 minutes at about 80° C., diluted with 120 parts water, then set aside at room temperature for aging observations. A second solution was prepared in the same manner except that 30 parts of the "Urea-Formaldehyde Concentrate 85" was substituted for the trimethylolphenol. A third solution containing only the starch and water in the same proportions cited above was also prepared as a control. After 3 days at room temperature, the control solution had a viscosity of 316 cps., the trimethylolphenol-starch reaction product had a viscosity of 36 cps. and the urea-formaldehyde-starch mixture had a viscosity of 213 cps. After 17 days at room temperature, the urea-formaldehyde-starch product had gelled, the control had a viscosity of 630 cps., and the trimethylolphenol-starch product had a viscosity of only 50.5 cps. After 30 days at room temperature the control had a viscosity of 718 cps. while that of the trimethylolphenol-starch product was only 67 cps.

*Example 9*

A clear starch solution was prepared by heating 5 parts tapioca starch (made by National Starch Products Inc. under the brand name of "Amioca") and 5 parts thin boiling tapioca starch (made by the same company under the brand name of "Amioca 20") in 90 parts water for 20 minutes at about 200° F. The starch solution was cooled and 75 parts of this solution were mixed with three parts 70 percent aqueous 2,4,6-trimethylolphenol and 0.1 part concentrated hydrochloric acid. The solution was spread onto a clean glass plate with a 20 mil Boston Bradley blade and air dried for three days. The so-prepared coating was firmly adherent to the glass. It was stripped from the glass (with considerable difficulty) and the translucent, somewhat brittle unsupported film was then boiled in water five minutes without any visible effect.

For comparison purposes, a similar experiment was run substituting 3 parts of a water soluble phenol-formaldehyde resin containing 70 percent resinous solids for the 3 parts of 70 percent aqueous 2,4,6-trimethylolphenol. (Said phenolic resin was prepared by reacting 1½ moles formaldehyde and one mole phenol in the presence of a catalytic quantity of lime.) The film prepared in this manner was opaque, non-adherent to the glass, and "popped off" the glass plate after drying. When boiled in water, the film disintegrated in 10 minutes.

*Example 10*

A mixture consisting of 100 parts of starch solution (made as in Example 9), 4.8 parts 70 percent aqueous 2,4,6-trimethylolphenol solution, 91 parts clay (sold by Minerals and Chemicals Corp. under the name ASP–400), 0.3 part ammonium sulfamate and 50 parts water was ball milled 16 hours then spread in a thin layer onto a cellulose insulating board, air dried a few minutes, then baked 15 minutes at 300° F. For purposes of comparison, a clear casein type coating composition (1 part casein:7 parts clay) similar to that used to surface commercial cellulose insulating building boards was coated onto a second panel and subjected to a similar bake cycle. The sides and uncoated surfaces of both panels were sealed with polyvinyl acetate to prevent saturating the sample with water and both coatings were subjected to the Gardner Straight Line Washability Test as described in the 11th edition (1950) of the book "Physical and Chemical Examination of Paints, Varnishes, Lacquers, and Colors," H. A. Gardner and G. G. Sward, using a Gardner Model 105 Washability and Abrasion Machine (catalog No. 1700). The trimethylolphenol-starch-clay coating showed only slight failure after 700 cycles. The casein-clay composition failed completely after 25 cycles, i.e., scrubbed off to such an extent that the substrate showed through.

*Example 11*

A dry mixture consisting of 100 parts solid 2,4,6-trimethylolphenol, 100 parts sugar, 5 parts oxalic acid dihydrate and a trace of cationic solid detergent ("Alconox") was pulverized and mixed. The fine powder was dissolved in approximately 1½ times its weight of water (it dissolved very readily) and the solution was brushed onto wooden panels and tinplate panels. Some of the coated panels were oven dried at 50° C. for periods ranging from about 1 to 2 hours; others were air dried at room temperature for 24 hours. The air dried coatings were somewhat tacky. The oven dried coatings were smooth, transparent, and colorless and were not tacky. The latter coatings were water repellent, but scrubbing in water dulled the gloss to some degree.

*Example 12*

A solution designated as Solution A was prepared by dissolving 5 parts crystalline 2,4,6,-trimethylolphenol in 100 parts of a 10 percent aqueous solution of a polyvinyl acetate of which 75 percent of the acetyl groups had been hydrolyzed to hydroxyl.

A portion of Solution A was brushed onto part of a Portland cement coated building board (made by Johns-Manville Co. under the name of "Marinite") and air dried about ½ hour. The board was then baked 30 minutes at 300° F. The coated portion shed water readily and resisted penetration, while the uncoated portion was quite porous and absorbed water. A green oil-base enamel paint (made by Pratt & Lambert Paint Co. under the name of "Effecto") was brushed onto both the coated and uncoated surfaces and air dried. The enamel film on the uncoated board was irregular and uneven with respect to both thickness and appearance. The "hold-out" of the enamel on the coated surface was much superior, and uniformity of both appearance and thickness was much improved. Both enameled sections were set aside for seven months in air at room temperature then tested for underwater adhesion of the enamel. Adhesion of the enamel to the Solution A coated surface greatly exceeded that to the uncoated surface.

A second portion of Solution A was acidified with a few drops of concentrated hydrochloric acid, brushed onto a fresh panel of the same cement board, and air dried at room temperature (about 75° F.) for eight days. The time required for the so-coated panel and for an untreated panel to absorb 0.1 ml. of distilled water, protected from evaporation, when tested as prescribed in Technical Association of the Pulp and Paper Industry Standard Method T–432–m–45 was measured. The uncoated panel had an absorption time of 5 seconds, the coated panel in 14.5 min.

*Example 13*

To 15 parts of a solution containing 5 parts of polyvinyl acetate of which 75 percent of the ester groups had been hydrolyzed to hydroxyl was added 4.5 parts water, 2.5 parts of a 70 percent aqueous solution of 2,4,6-trimethylolphenol and 3 parts 6 percent hydrochloric acid. The solution was agitated several minutes to insure uniformity, then doctored onto a nickel plate and air dried 5 days at room temperature. The film so formed was stripped from the plate and examined. It was tough and water repellent.

A second film prepared in substantially similar manner from the partially hydrolyzed polyvinyl acetate itself dissolved readily in water.

*Example 14*

An aqueous solution consisting of 22.5 parts water, 2.5 parts polyvinyl alcohol and 1 part 2,4,6-trimethylolphenol was applied to the reverse (uncoated) surface of a cellulose building board, air dried several minutes, then baked 15 minutes at 300° F. The so-coated and an uncoated portion of the same board were then painted with the same green enamel paint used in Example 12 and allowed to dry. The "hold-out" of the enamel paint on the pre-coated surface was immensely superior to that of the control.

*Example 15*

To 200 parts of an 85:15 methanol:water solution containing 22 parts of a vinyl acetate polymer of which 31 percent of the acetate groups had been hydrolyzed to hydroxyl groups, were added 9 parts 2,4,6-trimethylolphenol and 2 parts 85 percent phosphoric acid. Said solution, 18.5 parts mica and 18.5 parts titanium dioxide were charged into a 1-pint pebble mill and milled three days at room temperature. Two sections of the cement board employed in Example 12 were coated with the homogeneous mixture so obtained. One panel was air-dried at room temperature overnight, the other was air dried about ½ hour then baked 12 minutes at 300° F. Pigmented polyvinyl acetate latex paint was then brushed onto these two areas and onto an untreated panel. After drying, all three panels were tested for adhesion of the latex paint. The paint film stripped easily from the uncoated panel, indicating very poor adhesion to the uncoated surface. The paint could not be stripped from either of the coated panels without breaking the cement surface, indicating excellent adhesion of the coating to the surface and of the latex paint to the coating.

*Example 16*

Eighty parts of a solution containing 20 percent vinyl acetate polymer of which 54 percent of the acetate groups had been hydrolyzed to hydroxyl groups dissolved in an approximately 1:1 water:ethanol mixture, 4 parts titanium dioxide and 4 parts mica were charged to a 1-quart pebble mill and milled 40 hours. To the mixture was added 11 parts of a 70 percent aqueous solution of 2,4,6-trimethylolphenol and 85 parts of a 1:1 mixture of water and ethanol. To this mixture which contained 13 percent by weight resin-forming solids was added 3 parts tris-beta-chloroethyl phosphate and 1.5 parts of a 0.08 N sulfuric acid and the mixture was agitated to insure uniformity. A thin layer of this mixture was applied to the rough (reverse) side of a cellulose insulating board, dried a few minutes at room temperature, then at 220° F. for 15 minutes. The coating was uniform and adherent and showed a high degree of water repellency. The coated surface and the corresponding surface of an uncoated panel were exposed to the Inclined Panel Flame Retardancy Test (National Paint, Varnish and Lacquer Association Circular No. 747) in which the flame from 1 ml. absolute alcohol impinges at 1-inch distance on the board inclined at a 45° angle. An area of about 38 square inches of the coated panel was charred by the flame, but after the alcohol was exhausted the board retained only a diminishing flickering flame which extinguished itself in 80 seconds with no after-glow. By contrast, the uncoated panel was charred over about three times as great an area and after the alcohol was consumed, the board continued to burn and glow and required soaking in water containing a wetting agent before the "punking" and reflaming were completely terminated.

We claim:

1. A copolymeric resin prepared by admixing and reacting 2,4,6-trimethylolphenol with a water-soluble compound containing as the sole reactive groups under the conditions of the reaction a plurality of reactive aliphatic hydroxyl groups, said water-soluble compound being selected from the group consisting of alkylene glycols, glycerine, pentaerythritol, sugar, starch, polyvinyl alcohol, polyoxyalkylene glycols, hydroxyethyl polyvinyl alcohol and partially hydrolyzed polyvinyl acetate, said 2,4,6-trimethylolphenol being employed in an amount sufficient to impart thermosetting properties to the resin.

2. A copolymeric thermosetting resin prepared by admixing and reacting in an aqueous medium 2,4,6-trimethylolphenol with a water-soluble compound containing as the sole reactive groups under the conditions of the reaction a plurality of reactive aliphatic hydroxyl groups, said water-soluble compound being selected from the group consisting of alkylene glycols, glycerine, pentaerythritol, sugar, starch, polyvinyl alcohol, polyoxyalkylene glycols, hydroxyethyl polyvinyl alcohol and partially hydrolyzed polyvinyl acetate, said 2,4,6-trimethylolphenol being employed in an amount between about 0.1 and 12 parts by weight per part of said water-soluble compound.

3. A copolymeric thermosetting resin prepared by admixing and reacting in an aqueous medium in admixture with catalytic amounts of an acidic catalyst 2,4,6-trimethylolphenol with a water-soluble compound containing as the sole reactive groups under the conditions of the reaction a plurality of reactive aliphatic hydroxyl groups, said water soluble compound being selected from the group consisting of alkylene glycols, glycerine, pentaerythritol, sugar, starch, polyvinyl alcohol, polyoxyalkylene glycols, hydroxyethyl polyvinyl alcohol and partially hydrolyzed polyvinyl acetate, said 2,4,6-trimethylolphenol being employed in an amount between about 0.1 and 12 parts by weight per part of said water-soluble compound.

4. The copolymeric resin claimed in claim 2 wherein the water-soluble compound is an alkylene glycol.

5. The copolymeric resin claimed in claim 2 wherein the water-soluble compound is sugar.

6. A thermoset resin prepared by admixing and reacting in admixture with catalytic amounts of an acidic catalyst 2,4,6-trimethylolphenol with a water-soluble compound containing as the sole reactive groups under the conditions of the reaction a plurality of reactive aliphatic hydroxyl groups, said water-soluble compound being selected from the group consisting of alkylene glycols, glycerine, pentaerythritol, sugar, starch, polyvinyl alcohol, polyoxyalkylene glycols, hydroxyethyl polyvinyl alcohol and partially hydrolyzed polyvinyl acetate, said 2,4,6-trimethylolphenol being employed in an amount between about 0.1 and 12 parts by weight per part of said water-soluble compound and thereafter heating the resulting mixture to thermoset the resin.

7. A process for producing a copolymeric thermosetting resin which consists of admixing and reacting 2,4,6-trimethylolphenol with a water-soluble compound containing as the sole reactive groups under the conditions of the reaction a plurality of reactive aliphatic hydroxyl groups, said water-soluble compound being selected from the group consisting of alkylene glycols, glycerine, pentaerythritol, sugar, starch, polyvinyl alcohol, polyoxyalkylene glycols, hydroxyethyl polyvinyl alcohol and partially hydrolyzed polyvinyl acetate, said 2,4,6-trimethylolphenol being employed in an amount sufficient to impart thermosetting properties to the resin.

8. A process for producing a copolymeric thermosetting resin which consists of admixing and reacting in an aqueous medium 2,4,6-trimethylolphenol with a water-soluble compound containing as the sole reactive groups under the conditions of the reaction a plurality of reactive aliphatic hydroxyl groups, said water-soluble compound being selected from the group consisting of alkylene glycols, glycerine, pentaerythritol, sugar, starch, polyvinyl alcohol, polyoxyalkylene glycols, hydroxyethyl polyvinyl alcohol and partially hydrolyzed polyvinyl acetate, said 2,4,6-trimethylolphenol being employed in an amount between about 0.1 and 12 parts by weight per part of said water-soluble compound.

9. A process for producing a copolymeric thermosetting resin which consists of admixing and reacting in aqueous medium in admixture with catalytic amounts of an acidic catalyst 2,4,6-trimethylolphenol with a water-soluble compound containing as the sole reactive groups under the conditions of the reaction a plurality of reactive aliphatic hydroxyl groups, said water-soluble compound being selected from the group consisting of alkylene glycols, glycerine, pentaerythritol, sugar, starch, polyvinyl alcohol, polyoxyalkylene glycols, hydroxyethyl polyvinyl alcohol and partially hydrolyzed polyvinyl acetate, said 2,4,6-trimethylolphenol being employed in an amount between 0.1 and 12 parts by weight per part of said water-soluble compound.

10. A process for producing a copolymeric thermosetting resin according to claim 9 which consists of admixing and reacting in aqueous medium 2,4,6-trimethylolphenol with an alkylene glycol and curing the resin thus produced.

11. A process for producing a copolymeric thermosetting resin according to claim 9 which consists of admixing and reacting in aqueous medium 2,4,6-trimethylolphenol with a starch and curing the resin thus produced.

12. A process for producing a copolymeric thermosetting resin according to claim 9 which consists of admixing and reacting in aqueous medium 2,4,6-trimethylolphenol with sugar and curing the resin thus produced.

13. The copolymeric resin claimed in claim 2 wherein the water soluble compound is starch.

14. The copolymeric resin claimed in claim 2 wherein the water-soluble compound is polyvinyl alcohol.

15. The copolymeric resin claimed in claim 2 wherein the water-soluble compound is partially hydrolyzed polyvinyl acetate.

16. A thermoset resin prepared by heating the copolymeric resin of claim 1, for a time sufficient to cure the resin to a heat hardened infusible state.

17. The thermoset resin claimed in claim 16 wherein the water-soluble compound is starch.

18. The thermoset resin claimed in claim 16 wherein the water-soluble compound is an alkylene glycol.

19. The thermoset resin claimed in claim 16 wherein the water-soluble compound is sugar.

20. The thermoset resin claimed in claim 16 wherein the water-soluble compound is polyvinyl alcohol.

21. The thermoset resin claimed in claim 16 wherein the water-soluble compound is partially hydrolyzed polyvinyl acetate.

References Cited in the file of this patent

UNITED STATES PATENTS

| | | |
|---|---|---|
| 2,495,232 | Drisch et al. | Jan. 24, 1950 |
| 2,521,911 | Greenlee | Sept. 12, 1950 |
| 2,579,329 | Martin | Dec. 18, 1951 |
| 2,606,929 | Martin | Aug. 12, 1952 |
| 2,728,741 | Simon | Dec. 27, 1955 |

OTHER REFERENCES

Freeman: J.A.C.S., vol. 74, No. 24, December 20, 1952, pp. 6257–6260.